United States Patent
Iwata et al.

(10) Patent No.: US 9,463,398 B2
(45) Date of Patent: Oct. 11, 2016

(54) BUBBLE REMOVAL METHOD AND BUBBLE REMOVAL DEVICE

(75) Inventors: Shuichi Iwata, Nagoya (JP); Hideki Mori, Nagoya (JP)

(73) Assignee: NAGOYA INSTITUTE OF TECHNOLOGY, Nagoya (JP)

( * ) Notice: Subject to any disclaimer, the term of this patent is extended or adjusted under 35 U.S.C. 154(b) by 79 days.

(21) Appl. No.: 14/238,288

(22) PCT Filed: Jul. 30, 2012

(86) PCT No.: PCT/JP2012/069344
§ 371 (c)(1),
(2), (4) Date: Feb. 11, 2014

(87) PCT Pub. No.: WO2013/021849
PCT Pub. Date: Feb. 14, 2013

(65) Prior Publication Data
US 2014/0202331 A1    Jul. 24, 2014

(30) Foreign Application Priority Data

Aug. 11, 2011  (JP) ................................. 2011-175640

(51) Int. Cl.
*B01D 61/04* (2006.01)
*C02F 1/20* (2006.01)
*B01D 19/00* (2006.01)

(52) U.S. Cl.
CPC ....... *B01D 19/0036* (2013.01); *B01D 19/0073* (2013.01)

(58) Field of Classification Search
CPC .............. B01D 19/02; B01D 19/0078; B01D 19/0031; B01D 63/025; B01D 63/027; B01D 61/025; B01D 61/04; B01D 2313/10; B01D 2313/20; B01D 2313/44; B01D 2313/13; B01D 2311/04; B01D 2311/13; C02F 1/20; C02F 1/441
USPC ........ 95/242, 260, 266; 96/176, 193, 194, 6, 96/178; 604/5.01; 210/640
See application file for complete search history.

(56) References Cited

U.S. PATENT DOCUMENTS 4,339,247 A    7/1982  Faulkner et al.
8,753,431 B2 *  6/2014  Iwata et al. ..................... 95/242
(Continued)

FOREIGN PATENT DOCUMENTS

JP    A-58-500601    4/1983
JP    U-5-51405      7/1993
(Continued)

OTHER PUBLICATIONS

Ishii et al., "Concepts in Basic Bubble and Foam Engineering," Techno-System Co. Ltd., 2005, pp. 588-605.
(Continued)

*Primary Examiner* — Jacob T Minskey
*Assistant Examiner* — Minh-Chau Pham
(74) *Attorney, Agent, or Firm* — Oliff PLC (57) ABSTRACT

A bubble removal method removes a bubble from liquid whose viscosity is reduced when shear occurs. A vessel whose volumetric capacity is variable is used. The interior of the vessel is depressurized and pressurized by increasing and decreasing the volumetric capacity of the vessel from a plurality of locations. As a result, the volume of the bubble is increased and decreased and the bubble is caused to move and be removed.

12 Claims, 6 Drawing Sheets

(56) References Cited

U.S. PATENT DOCUMENTS

| | | | |
|---|---|---|---|
| 2011/0036240 A1* | 2/2011 | Taylor | B01D 19/0031 96/6 |
| 2011/0137941 A1* | 6/2011 | Hoffman | G06F 17/30867 707/779 |
| 2011/0245750 A1* | 10/2011 | Lynch | A61M 1/3627 604/5.01 |
| 2012/0137889 A1 | 6/2012 | Iwata et al. | |
| 2012/0247337 A1* | 10/2012 | Taylor | B01D 19/0031 96/6 |
| 2014/0263061 A1* | 9/2014 | Taylor | C02F 1/1447 210/640 |
| 2014/0305310 A1* | 10/2014 | Chien | A01K 63/04 96/178 |

FOREIGN PATENT DOCUMENTS

| | | |
|---|---|---|
| JP | A-7-100423 | 4/1995 |
| JP | A-7-144104 | 6/1995 |
| JP | A-8-131711 | 5/1996 |
| JP | A-8-187404 | 7/1996 |
| JP | A-2007-54680 | 3/2007 |
| WO | WO 2011/018927 A1 | 2/2011 |

OTHER PUBLICATIONS

Iwata et al., "Pressure-Oscillatory Defoaming for Shear-Thinning Fluids," *The Society of Chemical Engineers*, 2007, pp. 294-299 (with Abstract).

International Search Report issued in International Patent Application No. PCT/JP2012/069344 dated Oct. 16, 2012 (with translation).

Written Opinion issued in International Patent Application No. PCT/JP2012/069344 dated Oct. 16, 2012 (with partial translation).

International Preliminary Report on Patentability issued in International Patent Application No. PCT/JP2012/069344 dated Feb. 19, 2013 (with partial translation).

\* cited by examiner

BUBBLE REMOVAL METHOD AND BUBBLE REMOVAL DEVICE

TECHNICAL FIELD

The present invention relates to a method for removing a bubble contained in a liquid and a device for removing a bubble contained in a liquid.

BACKGROUND ART

It is not easy to remove a bubble in highly viscous fluid because of its viscosity, and various defoaming methods have been used. (See Patent Literatures 1 to 6, and Non-patent Literatures 1 and 2).

With respect to this type of known technology, in order to efficiently remove a bubble included in a liquid, the applicant of the present application proposed a "Bubble Removal Method and Bubble Removal Device" as disclosed in PTL 7. This method is a bubble removal method that continuously removes bubbles. The method uses a vessel which has one or more inlets and two or more outlets and which has a structure that allows its volumetric capacity to be varied. The method allows non-Newtonian fluid to pass through the vessel and changes the volumetric capacity of the non-Newtonian fluid in the vessel by vibration to depressurize and pressurize the interior of the vessel, thus increasing and decreasing the volume of a bubble contained in the non-Newtonian fluid and causing the bubble to move to a specific outlet. The method is characterized by performing depressurization and pressurization inside the vessel while the pressure changes are maintained inside the vessel by means for maintaining the flow resistance that are provided on each of the inlet and the outlets.

CITATION LIST

Patent Literature

[PTL 1]
Japanese Unexamined Patent Publication No. JP-A-Hei 7 (1995)-144104
[PTL 2]
Japanese Unexamined Patent Publication No. JP-A-Hei 7 (1995)-100423
[PTL 3]
Japanese Unexamined Patent Publication No. JP-A-Hei 8 (1996)-187404
[PTL 4]
Japanese Unexamined Patent Publication No. JP-A-Hei 8 (1996)-131711
[PTL 5]
Japanese Unexamined Patent Application. Publication No. JP-A-2007-54680
[PTL 6]
Japanese Unexamined Utility Model Application Publication No. JP-UM-A-Hei 5 (1993)-51405
[PTL 7]
International Patent Application Laid-Open No. WO 2011/018927

NON-PATENT LITERATURE

[NPTL 1]
Concepts in Basic Bubble and Foam Engineering, ed. Yoshio Ishii et al. Techno-System Co. Ltd., 2005
[NPTL 2]
Shuichi Iwata, Shingo Uchida, Kazuto Ishida, and Hideki Mori, Kagaku Kogaku Ronbunshu, vol. 33, No. 4, 2007, pp. 294-299

SUMMARY OF INVENTION

Technical Problem

According to the "Bubble Removal Method and Bubble Removal Device" disclosed in PTL 5 and PTL 7, the bubble included in the liquid can be removed, but it is necessary to make the removal of the bubble more efficient.

The present invention has been made in light of the above-described circumstances, and it is an object of the present invention to remove a bubble included in liquid more efficiently.

Solution to Problem

In order to achieve the above-described object, the present invention is characterized in that, with respect to a bubble removal method that removes bubbles by filling the interior of a vessel with a liquid whose viscosity is reduced when shear occurs and also increasing and reducing the volumetric capacity of the vessel to depressurize and pressurize the interior of the vessel and thus increase and decrease the volume of a bubble included in the liquid, the depressurization and pressurization of the interior of the vessel is performed from a plurality of locations.

In this manner, by increasing and decreasing the volume of the bubble included in the liquid passing through the vessel, it is possible to increase the natural ascending speed of the bubble, and it is thus possible to efficiently remove the bubble.

The above-described characteristics of the present invention can be specifically obtained in the following manner. Specifically, the depressurization and pressurization inside the vessel is performed by changing the volumetric capacity of the liquid inside the vessel through oscillation from a plurality of locations of the vessel, while shifting the phase of the oscillation from the plurality of locations or causing the frequency of the oscillation to be different.

Note that, "the liquid whose viscosity is reduced when shear occurs" in the present invention does not refer only to a liquid whose viscosity over the whole range of the shear rate is reduced when shear occurs, and the meaning also includes a liquid whose viscosity over a part of the range of the shear rate is reduced when shear occurs.

DESCRIPTION OF EMBODIMENTS

Hereafter, description will be given to embodiments in which the present invention is embodied.

First Embodiment

In relation to the first embodiment, the effect of the present invention will be described through comparison of the following observed after a bubble is produced in the device: the movement trajectory of the bubble observed when the present invention is not used and the movement trajectory of the bubble observed when the present invention is used.

Figure 1:
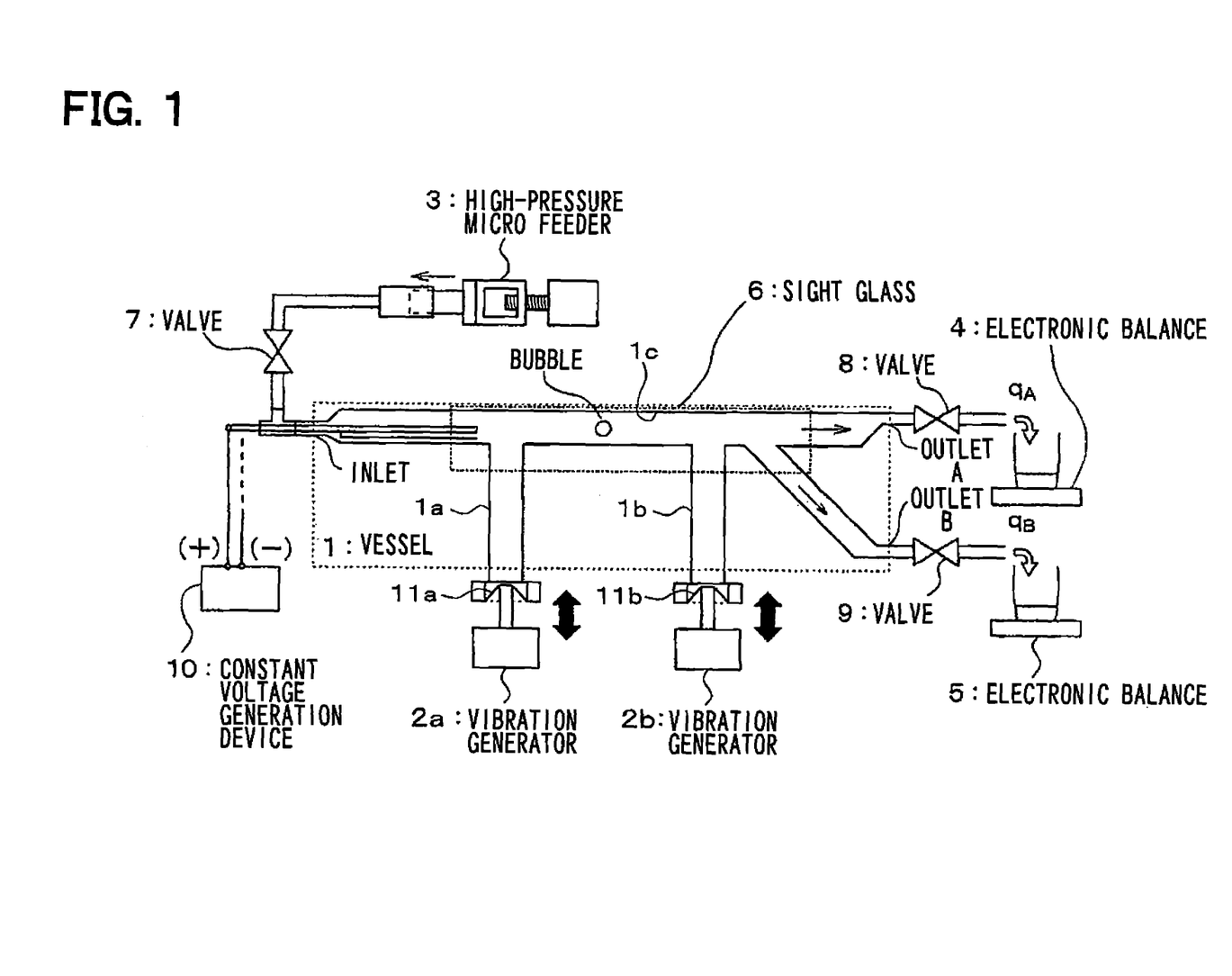
FIG. 1 is a drawing illustrating the overall configuration of a continuous defoaming device in a first embodiment of the present invention.

As illustrated in FIG. 1, the device is comprised of a vessel 1, vibration generators 2a and 2b, a high-pressure micro feeder 3, and electronic balances 4, 5 on which beakers are placed. Using this device, a bubble in the vessel 1 is separated by moving the bubble to one outlet. Specifically, the vessel 1 has one inlet for liquid (liquid inlet) and two outlets A, B for liquid (liquid outlets) and the trajectory of the bubble can be observed through a sight glass 6 for visualization.

The outlet A is an upper outlet positioned in the upper portion of the vessel 1 and the outlet B is a lower outlet positioned below the outlet A. The high-pressure micro feeder 3 feeds liquid to the inlet of the vessel 1. The liquid fed to the inlet of the vessel 1 flows in the vessel 1 toward the outlets A, B.

The two vibration generators 2a and 2b are connected, respectively, to two film-like movable portions 11a and 11b that form the lower end portion of the vessel 1. The vibration generators 2a and 2b apply pressure oscillation (internal pressure oscillation) to the vessel 1. In this example, the movable portions 11a and 11b that are part of the vessel 1 are each formed of an elastic body, such as rubber. The vibration generators 2a and 2b elastically deform the movable portions 11a and 11b of the vessel 1. This makes it possible to increase and reduce the volumetric capacity of the vessel 1.

The arrangement of the movable portions 11a and 11b and the structure relating to the arrangement will be further explained below. The movable portions 11a and 11b are arranged in mutually different locations on the lower portion of the vessel 1. More specifically, as shown in FIG. 1, the interior of the vessel 1 is provided with a main flow path 1c that is used to feed the liquid from the inlet to the outlet A and the outlet B, and two additional portions 1a and 1b, which are connected to the main flow path 1c and which branch from the main flow path 1c and extend downward. Further, with respect to the flow of the liquid inside the main flow path 1c from the inlet to the outlets A and B (a flow from the left to the right in FIG. 1), the additional portion 1a branches from the main flow path 1c from a location further upstream than the additional portion 1b. The additional portions 1a and 1b are also filled with the liquid, similarly to the main flow path 1c.

The reason that the additional portions 1a and 1b branch from the main flow path 1c and extend in the downward direction is to reduce the possibility of a bubble entering the liquid that fills the additional portions 1a and 1b.

Further, the movable portions 11a and 11b are arranged, respectively, on the lower portions of the additional portions 1a and 1b. In this manner, the vibration generators 2a and 2b can increase or reduce the volumetric capacity of the vessel 1 by applying pressure oscillation to the liquid inside the vessel 1 from the two mutually different locations of the vessel 1. Then, with respect to the liquid flowing in the main flow path 1c, the pressure oscillation applied by the vibration generator 2a is transmitted to the main flow path 1c from a more upstream position than the pressure oscillation applied by the vibration generator 2b.

Note that, in the present example, a cross-sectional shape of the outer edges of the main flow path 1c forms a square in which each side is 7 mm, but the present invention is not limited to this type of example. Further, an interval along the main flow path 1c from the position at which the main flow path 1c and the additional portion 1a branch to the position at which the main flow path 1c and the additional portion 1b branch is 110 mm, but the present invention is not limited to this type of example.

Valves (throttle valves) 7, 8, 9 are installed in piping sections connected to the vessel 1. The pressure oscillation (internal pressure oscillation) of the vessel 1 is maintained and the flow ratio on the outlet side is set by adjusting the valve opening of each valve (significantly narrowing down the valve opening).

Since the valve opening of each of the valves 7, 8, 9 is significantly narrowed down, the flow resistance of each of the valves 7, 8, 9 is significantly increased. As a result, the interior of the vessel 1 is depressurized and pressurized when the vibration generator 2 increases and reduces the volumetric capacity of the vessel 1. The high-pressure micro feeder 3 pressure feeds liquid against the flow resistance of each of the valves 7, 8, 9.

That is, the valves 7, 8, 9 form means for giving resistance against flow of liquid between the inside and the outside of the vessel 1; and the high-pressure micro feeder 3 forms means for pressure feeding liquid so that the liquid passes through the vessel 1 against the resistance of each of the valves 7, 8, 9.

A phase of each of the two vibration generators 2a and 2b can be adjusted. When the two vibration generators 2a and 2b are operated in the same phase, the two film-like movable portions that are attached to the lower portion of the vessel 1 apply the pressure oscillation (the internal pressure oscillation) to the vessel 1 in the same phase. When the vibration generators 2a and 2b are dephased and operated, as well as applying the pressure oscillation (the internal pressure oscillation) to the vessel 1, a flow also occurs between the film-like movable portions in the vessel, due to the difference in the application of the pressure oscillation.

In this example, the pumping pressure of the high-pressure micro feeder 3 is set to 0.4 to 5 in atmospheric pressure or so, but it may be a higher or lower pumping pressure. Favorable pumping pressure relates to the size of a bubble and the performance of the vibration generators 2. More specifically, a large bubble is prone to be shrunk; therefore, the defoaming effect on large bubbles can be obtained even though the pumping pressure of the high-pressure micro feeder 3 is low. When the performance of the vibration generators 2a and 2b is high, it is possible to expand and shrink a bubble even though the pumping pressure of the high-pressure micro feeder 3 is high. Therefore the defoaming effect can be obtained.

To introduce bubbles to be defoamed by the high-pressure feeder deforming, a method is used in which a constant voltage generation device 10 is energized only for a predetermined time and a bubble is generated by an electrode installed in the vessel 1.

The sight glass, constant voltage generation device, and electrode were used to verify the bubble separation effect. They are not always necessary for the method or device of the present invention.

Figure 2:
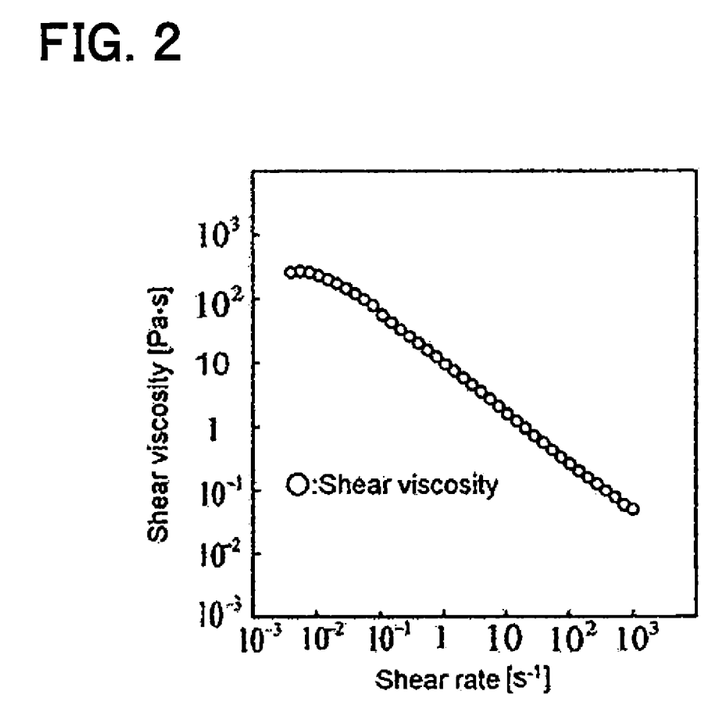
FIG. 2 is a drawing illustrating the rheological characteristics of a solution in the first embodiment of the present invention.

The sample (highly viscous fluid) used to describe this embodiment is a 0.900 wt % sodium polyacrylate solution and FIG. 2 indicates its viscosity curve. As seen from FIG. 2, when the shear rate is significantly small, as well as indicating a viscosity of 253 Pa·s, the sample (0.900 wt % sodium polyacrylate solution) has such properties (shear thinning properties) that its shear viscosity is reduced with an increase in the shear rate.

One of preferred embodiments of continuous defoaming is that the viscosity of a solution is reduced by shear. In other words, a liquid whose viscosity is reduced when shear occurs is suitable for the solution.

The solution is not limited to a liquid whose solution viscosity is reduced by shear over all the range of the shear rate. Any liquid is acceptable as long as the viscosity of its solution is reduced by shear within part of the range of the shear rate. That is, a liquid is acceptable as long as the viscosity of its solution is reduced within the range of the rate of shear that occurs in proximity to a bubble. Therefore, non-Newtonian liquid, Bingham plastic fluid, and the like are suitable for the solution.

However, also in Newtonian fluid whose viscosity does not depend on shear, the defoaming effect of this embodiment can be expected. Any viscous fluid such as paint, coating agent, polymer, paste, and slurry is acceptable as long as it meets these requirements for viscous fluid.

This embodiment uses 300 Hz for a frequency at which oscillation is applied. Any frequency is acceptable as long as it is preferably a low frequency of 4000 Hz or below. For example, 150 Hz is also acceptable. That is, it is sufficient if the fluid viscosity in proximity to a bubble is reduced by shear and this relates to all of the frequency of oscillation, a pressure fluctuation range and the phase.

The movement characteristics of a bubble were compared with respect to a case where pressure oscillation of 300 Hz was applied and a case where it was not applied. Strobe light was applied from the back side of FIG. 1 with a frequency of 301 Hz and the outcome was shot with a high-resolution digital video camera set on the near side of the drawing. Using two electronic balances, the flow rate at each outlet was measured.

First, the valve opening of each of the valves 8, 9 on the downstream side (outlets A, B side) was adjusted so that a bubble flowed to the outlet B under constant pressure conditions without the application of pressure oscillation. The opening of the valve 7 on the upstream side (inlet side) was also narrowed down to provide a differential pressure. 100% is taken as the full opening of each of the valves 7, 8, 9. In this example, the opening of the valve 7 on the inlet side was narrowed down to 4%; the opening of the valve 8 on the outlet A side was narrowed down to 0.4%; and the opening of the valve 9 on the outlet B side was narrowed down to 3.6%.

Figure 3:
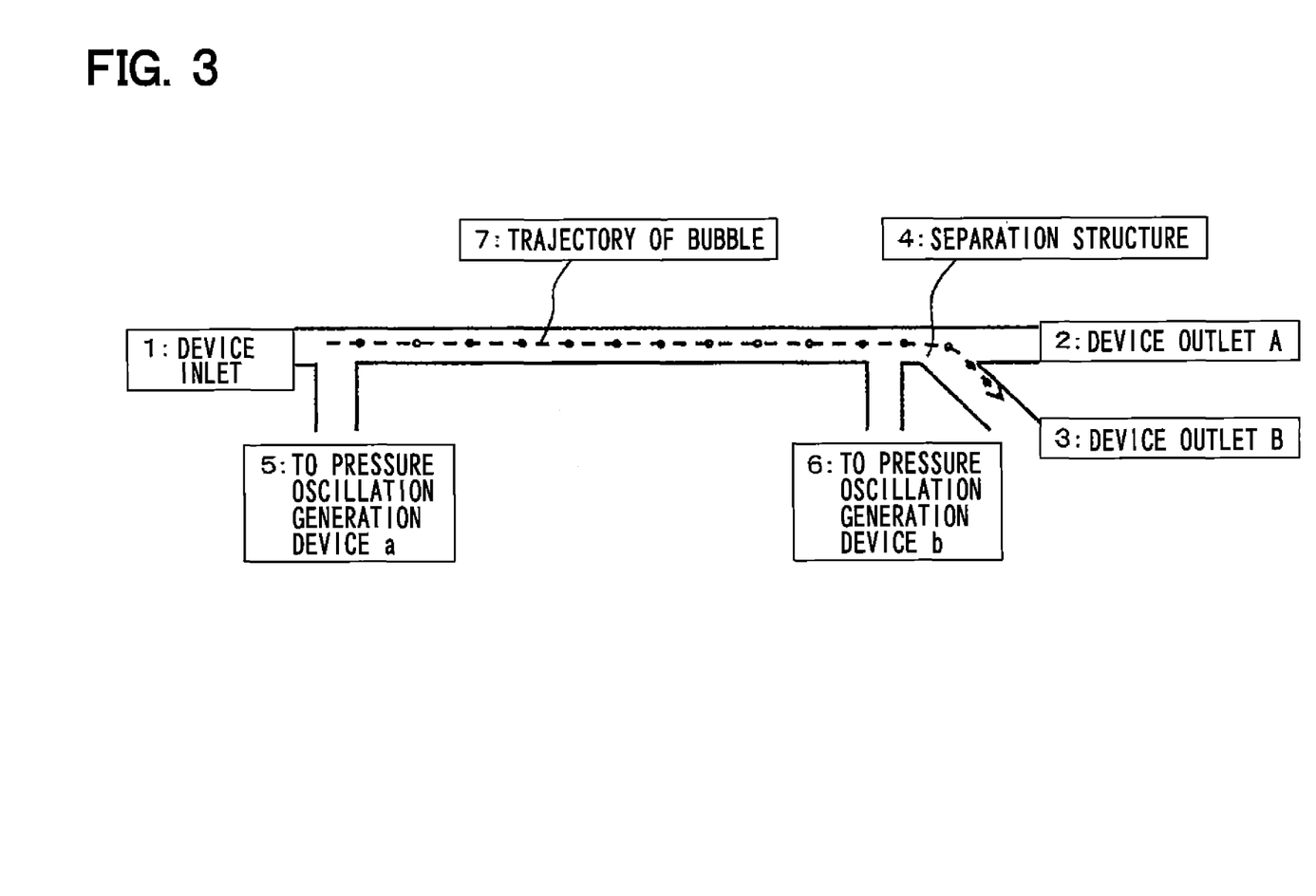
FIG. 3 is a drawing illustrating the trajectory of a bubble under constant pressure conditions in the first embodiment of the present invention.

At this time, the supply flow rate was 6 ml/min and the flow ratio of outlet A:outlet B was 1:9. FIG. 3 indicates the trajectory of a bubble in the vessel under constant pressure. The bubble diameter was 1.65 mm. Due to the high viscosity, the natural ascending speed of the bubble was extremely small, and the bubble moved almost horizontally toward the outlet A. Since the amount of liquid flowing to the outlet B was large, the bubble eventually moved to the outlet B.

Figure 4:
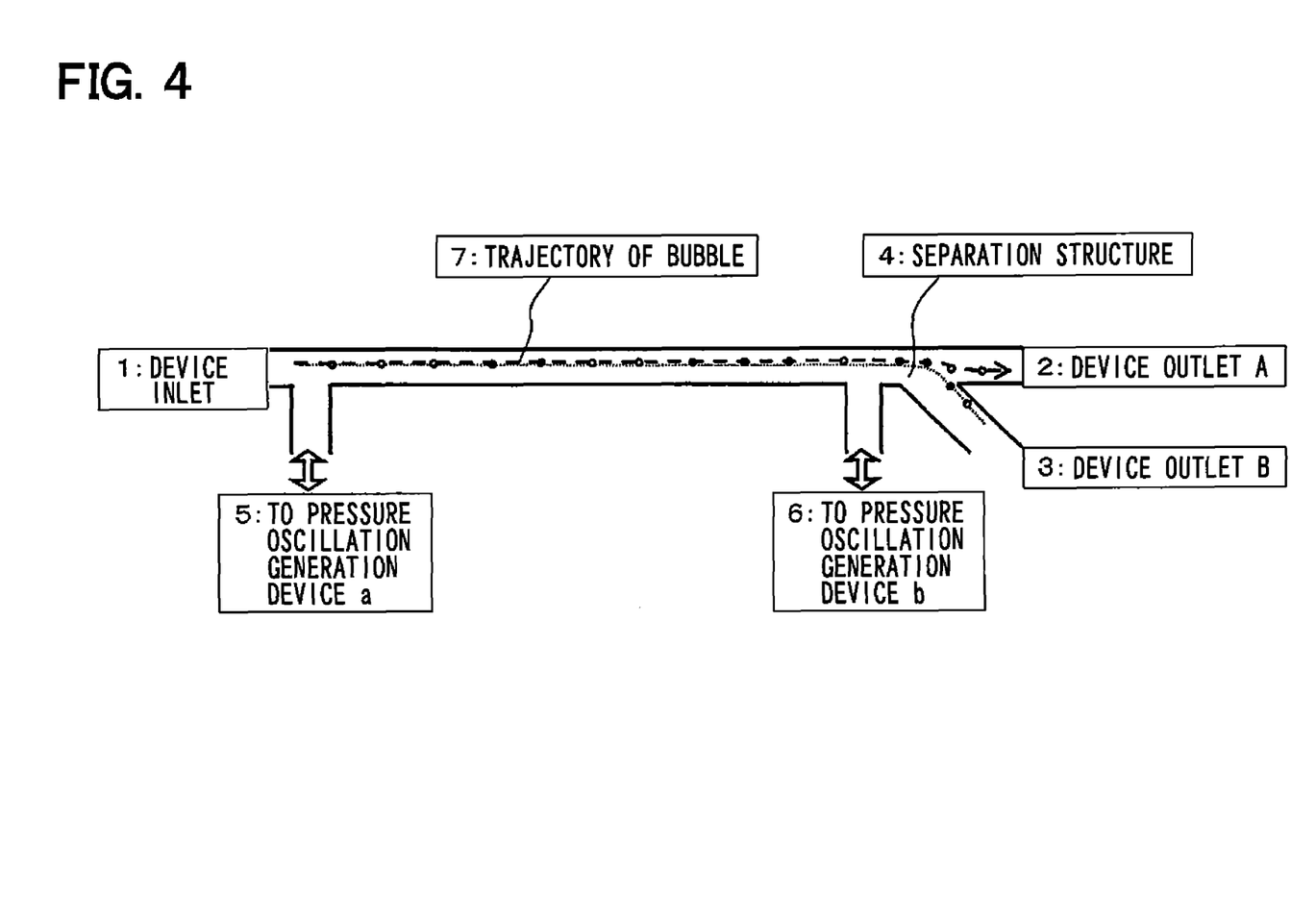
FIG. 4 is a drawing illustrating the trajectory of a bubble under pressure oscillation conditions in a same phase in the first embodiment of the present invention.

FIG. 4 indicates the trajectory of a bubble observed when the constant pressure conditions and the flow rate were set as mentioned above and pressure oscillation was applied by the two vibration generators being operated at the same frequency and in the same phase. The broken line in the drawing indicates the above-mentioned trajectory of the bubble in FIG. 3. As a result of the application of pressure oscillation, the trajectory was different to that under the constant pressure conditions, and the bubble gradually moved toward the upper side of the vessel. Thereafter, the bubble moved toward the outlet A. It was assumed that the liquid that flowed out of the outlet B was the processed liquid (product) of the continuous defoaming device and it was demonstrated that bubbles can be removed by the present invention.

Figure 5:
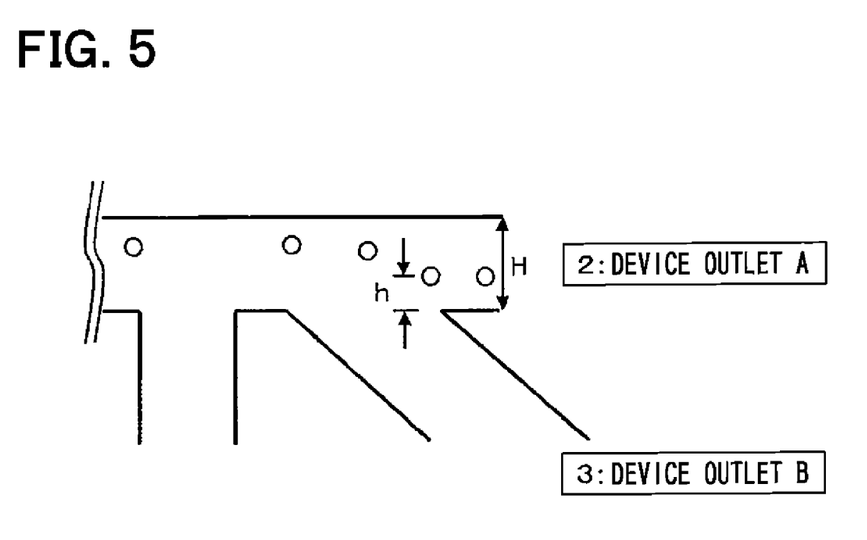
FIG. 5 is a drawing defining movement positions of a bubble in a liquid branching portion in the first embodiment of the present invention.

Next, a function generator was used and the pressure oscillation was applied by operating the two vibration generators at the same frequency and with a phase shift of δ. As an index to evaluate the bubble removal performance, a dimensionless bubble height h/H was used, in which a position h of the bubble in a gas-liquid separation portion is normalized by a flow path height H, as shown in FIG. 5. The flow rate was the same as that under the constant pressure conditions. Here, the phase δ was 90 degrees, which means that the phase of the vibration generator 2a was operated 90 degrees in advance of the phase of the vibration generator 2b. Further, the value of δ was fixed until the bubble was discharged.

Figure 6:
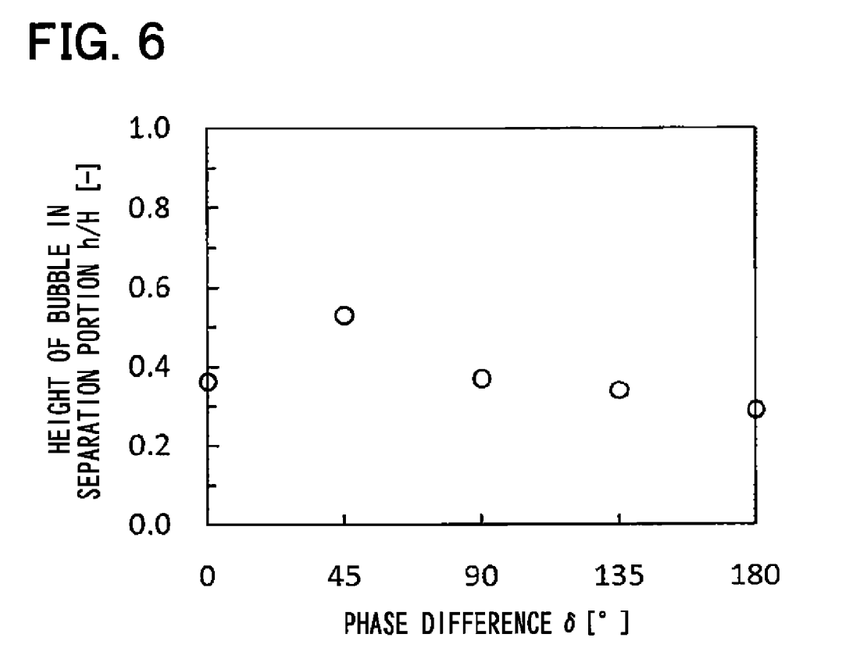
FIG. 6 is a drawing illustrating the influence on the bubble movement in a flow path branching portion due to differences in the phase of pressure oscillations in the first embodiment of the present invention.

FIG. 6 is a diagram indicating the dimensionless bubble height in the gas-liquid separation portion for each phase. The oscillation frequency used in the present embodiment was 300 Hz. When the phase of 0 degrees (the same phase) and the phase of 180 degrees (the opposite phase) were compared, it could be seen that the bubble height in the gas-liquid separation portion was large for the same phase, and the defoaming efficiency was improved. This is because, in the same phase, the volumetric capacity can be increased or reduced at the same timing on the vessel elastic bodies, and the pressure oscillation applied in the vessel was large. Thus, the strong expansion and shrinking flow, which occurred in the vicinity of the bubble due to the expansion and shrinking of the bubble, reduced the viscosity of the solution. On the other hand, in the opposite phase, although a reciprocating flow occurred, the effect of increasing and reducing the volumetric capacity of the vessel was small.

Further, when the phase δ was 90 degrees, the effects were improved more than at the time of the same phase. This was because, in a condition in which a small phase difference was applied, it was possible to secure sufficient increase and reduction of the volumetric capacity of the vessel and the pressure oscillation applied in the vessel was large. In addition, it is thought that the flow in the vicinity of the bubble resulting from the reciprocating motion of the bubble was effectively added, and the defoaming effects were improved.

The above-described phenomena are thought to arise from the following mechanisms.

When the two vibration generators are operated in the same phase, the vibration generator 2a and the vibration generator 2b shown in FIG. 1 simultaneously add pressure or decrease pressure on the elastic bodies, respectively, that form part of the vessel. For example, the two vibration generators uniformly pressurize and depressurize a bubble existing between the vibration generator 2a and the vibration generator 2b, and thus the center position of the bubble is almost unchanged, apart from movement caused by the flow of the high-pressure micro feeder. As a result, the flow of the liquid surrounding the bubble is mainly a simple flow due to expansion and shrinking.

Next, when the phase of the two vibration generators is different, the vibration generator 2a and the vibration generator 2b shown in FIG. 1 add pressure or decrease pressure at different timings on the elastic bodies, respectively, that form part of the vessel. For example, when the phase of the vibration generator 2b is slightly in advance of the phase of the vibration generator 2a, at a timing at which the vibration generator 2a changes from a depressurization process to a pressurization process, the vibration generator 2b has already performed the pressurization. At that moment, the flow from the vibration generator 2b to the vibration generator 2a exists. Next, at a timing at which the vibration generator 2a changes from the pressurization to the depressurization, the vibration generator 2b has already advanced to the depressurization process. At that moment, the flow from the vibration generator 2a to the vibration generator 2b exists. As a result, during one cycle of the process of the vibration generators, with respect to the center position of the bubble, a timing exists at which a flow of the liquid occurs from the vibration generator 2b to the vibration generator 2a and a timing exists at which a flow of the liquid occurs from the vibration generator 2a to the vibration generator 2b.

When the phase difference between the two vibration generators is slight, with respect to the flow of the liquid surrounding the bubble of the vessel 1, in addition to the flow caused by the expansion and shrinking in the same phase, a reciprocating flow of liquid also exists and it is thought that a complex flow thus develops in the vicinity of the bubble. Since the complex flow occurs, this means that the shear rate is increased and the viscosity of the liquid surrounding the bubble decreases due to the shear rate characteristics shown in FIG. 2, and the ascension of the bubble is accelerated.

In this embodiment, the piping sections are connected to the vessel 1 and thus the vessel 1 is not sealed. In the unsealed vessel 1 like this, if the valves 7, 8, 9 are not installed or if the valve opening of each of the valves 7, 8, 9 is set to a large value even when the valves 7, 8 9 are installed, when the volumetric capacity of the vessel 1 is increased and reduced by the vibration generators 2a and 2b, the liquid accordingly moves between the inside and the outside of the vessel 1. Therefore, the interior of the vessel 1 cannot be depressurized or pressurized.

In this embodiment, the valve opening of each of the valves 7, 8, 9 is significantly narrowed down to significantly increase the flow resistance. Therefore, when the volumetric capacity of the vessel 1 is increased and reduced, the movement of liquid between the inside and the outside of the vessel 1 in conjunction therewith can be suppressed. Specifically, when the volumetric capacity of the vessel 1 is increased, the inflow of liquid to the vessel 1 can be suppressed; and when the volumetric capacity of the vessel 1 is reduced, the outflow of liquid from the vessel can be suppressed. For this reason, the interior of the unsealed vessel 1 can be depressurized and pressurized.

As a result, the volume of a bubble contained in viscous fluid can be increased and reduced as in PTL 5 in which the vessel is sealed. A shear flow is produced around the bubble due to the volume of the bubble being increased and reduced and due to the existence of the reciprocating flow. Since the apparent viscosity of the viscous fluid is reduced by this shear, the viscosity resistance against the natural ascent of the bubble is reduced and the natural ascending speed of the bubble is increased.

Since the high-pressure micro feeder 3 pressure-feeds liquid against the flow resistance of each of the valves 7, 8, 9, the liquid can flow through the vessel 1 from the inlet to the outlets A, B at a substantially constant flow rate. For this reason, the bubble can be moved toward the outlet A and thus the viscous fluid with the bubble removed flows out of the outlet B.

According to this embodiment, the flow rate of liquid is kept substantially constant (the amount of liquid in the vessel 1 is kept substantially constant) even when the volumetric capacity of the vessel 1 is increased or reduced. Therefore, the internal pressure of the vessel is increased or reduced by increasing or reducing the volumetric capacity of the vessel 1.

For this reason, it is possible to achieve both passing liquid through the unsealed vessel 1 and increasing and reducing the volumetric capacity of the vessel 1 to depressurize and pressurize the interior of the vessel. Bubbles can be thereby continuously removed. Therefore, bubbles can be more efficiently removed than with the batch bubble removal methods using a sealed vessel as in the above-mentioned PTL 5.

Second Embodiment

In the second embodiment, the continuous bubble separation device shown in FIG. 1 was used to slightly change the frequency of the pressure vibration generators.

Figure 7:
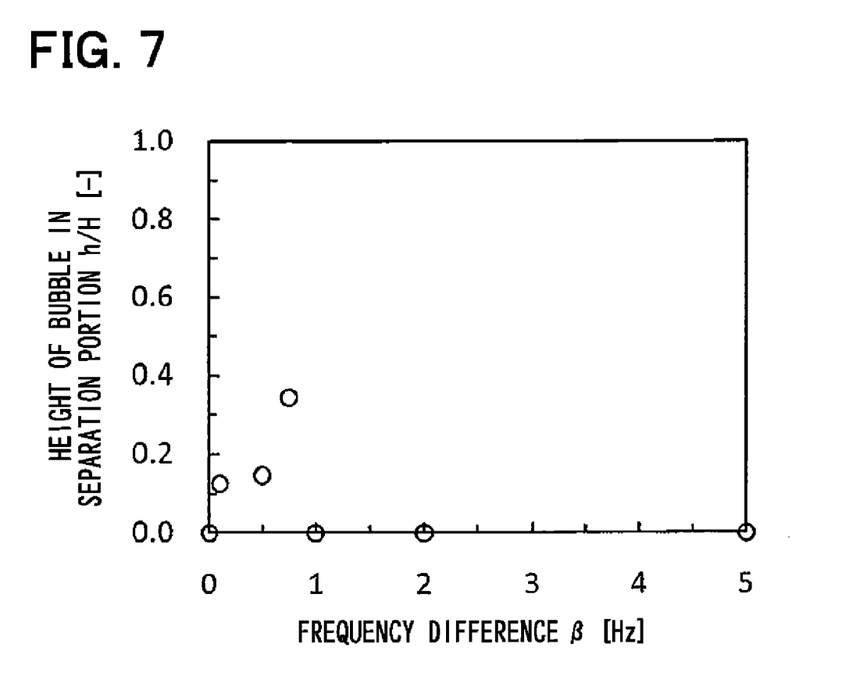
FIG. 7 is a drawing illustrating the influence on the bubble movement in the flow path branching portion due to differences in the frequency of pressure oscillations in the first embodiment of the present invention.

A bubble was produced in the vessel as in the first embodiment. At this time, the supply flow rate was 6 ml/min and the flow ratio of outlet A:outlet B was 1:10. The bubble diameter was 1.8 mm. The vibration generator 2a applied a pressure oscillation of 300 Hz and the vibration generator 2b applied a pressure oscillation of 300+$\beta$ Hz, respectively. As shown in FIG. 7, when $\beta$=0, this is the same as when $\delta$=0 in the first embodiment. When 13 was a small value, an increase in the dimensionless height h/H in the gas-liquid separation portion was observed, and as $\beta$ became larger, the dimensionless height h/H decreased. When the difference in frequency was $\beta$ Hz, the same phase in the vibration generators was obtained at a rate of $\beta$ times per second. An instant of a complete opposite phase is also included, but as more conditions exist in which there is a slightly different phase shift, if an appropriate $\beta$ is used, the dimensionless height h/H increases. Thus, by assigning slightly different frequencies to the vibration generators, it is possible to efficiently remove a bubble.

In the second embodiment, when the operating frequencies of the vibration generator 2a and the vibration generator 2b are slightly different, the phase difference changes cyclically. When the difference in the frequencies is 1 Hz, the phase changes by 360 degrees each second. When a phase difference is applied as in the first embodiment, there are cases in which there is a large effect or a small effect on the acceleration of the ascending speed of the bubble, but when the frequency is different, it is anticipated that those effects will be averaged out and obtained.

According to the above-described first and second embodiments, the various characteristics described below are obtained.

Each of the above-described first and second embodiments is a bubble removal method for removing bubbles from liquid whose viscosity is reduced when shear occurs, characterized by including:

using a vessel, including a liquid inlet and a plurality of liquid outlets, whose volumetric capacity is variable and means for giving resistance against flow of the liquid between inside and outside of the vessel;

causing the liquid to pass through the vessel against the resistance and increasing and decreasing the volumetric capacity of the vessel from a plurality of locations; and causing a reciprocating flow to occur as well as depressurizing and pressurizing the inside of the vessel.

In this manner, by causing the reciprocating flow while increasing and reducing the volume of the bubble included in the liquid passing through the vessel, it is possible to increase the natural ascending speed of the bubble and it is thus possible to efficiently remove the bubble.

The first and second embodiments are bubble removal methods in which: a vessel that includes one or more inlets and two or more outlets and whose volumetric capacity is variable is used; non-Newtonian fluid is passed through the vessel; the volumetric capacity of the non-Newtonian fluid in the vessel is varied by vibration from a plurality of locations to depressurize and pressurize the interior of the vessel and to cause a reciprocating flow; the volume of a bubble contained in the non-Newtonian fluid is thereby increased and reduced; and a center position of the bubble is caused to move reciprocatingly, in order to move the bubble to a specific outlet, and bubbles are thereby continuously removed.

The bubble removal methods are characterized in that pressure change and the reciprocating flow in the vessel are held by means for maintaining the resistance of a flow provided at each of the inlet portion and the outlet portions and the interior of the vessel is depressurized and pressurized.

The first and second embodiments are characterized in that the depressurization and the pressurization inside the vessel is performed by changing the volumetric capacity of the liquid inside the vessel through oscillation from the plurality of locations of the vessel, and the reciprocating flow is caused to occur in the liquid inside the vessel by shifting the phase of oscillation from the plurality of locations or by varying the frequency of the oscillation.

In the first and second embodiments, the means for branching the flow that includes the bubbles and the flow that does not include the bubbles is provided in the structure of the flow path inside the vessel, and thus the bubbles are continuously removed.

The first and second embodiments are characterized by including: a vessel that has a liquid inlet and a plurality of liquid outlets and whose volumetric capacity is variable; volumetric capacity varying means for operating on the vessel and increasing and reducing the volumetric capacity of the vessel; means for giving resistance against the flow of liquid between the inside and the outside of the vessel such that the interior of the vessel is, depressurized and pressurized when the volumetric capacity varying means increases and reduces the volumetric capacity of the vessel. The volumetric capacity varying means operates to increase and reduce the volumetric capacity of the vessel in a plurality of locations of the vessel, and a reciprocating flow is caused to occur in the liquid inside the vessel by causing each of the operation timings to be different.

It is preferable that the volumetric capacity varying means be means for increasing and reducing the volumetric capacity of the vessel using low frequency oscillations having different phases or frequencies.

In the above-described structure that makes it possible to change the volumetric capacity, a part of the vessel is formed by elastic bodies, and the volumetric capacity varying means elastically deforms the elastic bodies.

The above-described first and second embodiments are provided with means for pressure-feeding liquid such that the liquid flows through the vessel against the flow resistance.

The above-described first and second embodiments have, as the plurality of liquid outlets, the upper outlet positioned in the upper portion of the vessel and the lower outlet positioned below the upper outlet. The interior of the vessel is depressurized and pressurized and thus the bubble is caused to move to the upper outlet.

The above-described first and second embodiments are bubble removal devices that continuously remove bubbles. The bubble removal devices change, through oscillation, the volumetric capacity of viscous fluid flowing through a vessel, thus depressurizing and pressurizing the interior of the vessel and thereby increasing and decreasing the volume of a bubble included in the viscous fluid and causing the bubble to move to a specific outlet. The bubble removal devices are characterized by including: a vessel structured such that it has one or more inlets and two or more outlets and such that its volumetric capacity is variable; vibration generators that are used to perform depressurization and pressurization inside the vessel by changing the volumetric capacity of a viscous fluid inside the vessel through oscillation; and means for maintaining flow resistance that are provided on each of the inlet portion and the outlet portions in order to maintain pressure changes inside the vessel. The vibration generators are provided in a plurality of locations of the vessel, and a reciprocating flow is caused in the liquid inside the vessel by shifting the phase or varying the frequency of the oscillation by each of the vibration generators.

In the above-described first and second embodiments, the structure of the flow path inside the vessel includes a structure that branches to a flow that includes the bubbles and a flow that does not include the bubbles.

Further, the vessel 1 of the above-described embodiments has the film-like movable portions 11a and 11b, and the volumetric capacity inside the vessel 1 is variable as a result of the oscillation of the film-like movable portions 11a and 11b. However, the vessel that has the variable volumetric capacity is not necessarily limited to this type of example. For example, in place of the above-described film-like movable portions 11a and 11b, a vessel can be adopted that has pistons that can move up and down and that are fitted in a fluid-tight manner with each of the additional portions 1a and 1b.

Further, in each of the above-described embodiments, each of the vibration generators 2a and 2b applies pressure oscillation to the liquid inside the vessel continuously and cyclically while the phase or the frequency is shifted. However, the present invention is not necessarily limited to this example. For example, it is thought that the same effects as those of the above-described embodiments can be obtained even if, in place of the vibration generators 2a and 2b, two pulse generators are used that generate random pulse oscillation and perform pressurization or depressurization inside the vessel 1 in a pulse-like manner at different timings from the movable portions 11a and 11b, respectively.

In other words, it is sufficient that the present invention uses the plurality of volumetric capacity varying means (such as the above-described vibration generators 2a and 2b or pulse generators etc.) to depressurize and pressurize the interior of the vessel 1 from a plurality of locations of the vessel 1 while, at the same time, the timings to increase and reduce the volumetric capacity of the vessel 1 from the plurality of locations of the vessel 1 are mutually different.

Furthermore, even if the volumetric capacity varying means depressurizes or pressurizes the interior of the vessel 1 at only the same timing from different locations of the vessel 1 (for example, using continuous oscillation at the same frequency or in the same phase), it is possible to obtain high defoaming effects in comparison to a case in which the interior of the vessel 1 is depressurized or pressurized from a single location.

This is because, due to restrictions resulting from the performance etc. of the vibration source, outputs (an amount of change in volume, a pressurization force etc) when depressurization and pressurization are performed from one location are limited, and thus, if the depressurization and pressurization are performed from a plurality of locations, it is possible to depressurize and pressurize the liquid using outputs that exceed those limitations overall.

In addition, by positioning the plurality of vibration sources on the upstream and downstream of the flow of the liquid from the inlet to the outlets, even if the flow path that feeds the liquid from the inlet to the outlets (the main flow path 1c in the above-described embodiments) is made long, it is possible to efficiently transmit the oscillation to each location in the vessel (namely, it is possible to suppress attenuation). As a result, by making the flow path that feeds the liquid from the inlet to the outlets long and by arranging the vibration sources on the upstream and the downstream of the flow path, it is possible to increase the length of the path along which the bubble can sufficiently receive the pressure oscillation and move, and thus it is possible to increase the ascending amount of the bubble.

Furthermore, if it is assumed that a plurality of the bubbles exist in the liquid, the pressure oscillation applied from a single vibration source is consumed by the change in the volume of the bubble that is closest to the vibration source and does not sufficiently reach the other bubbles. In other words, the pressure oscillation that is applied from the single vibration source is blocked by the bubble that is closest to the vibration source. In contrast, when a plurality of vibration sources are used to apply the pressure oscillation to the liquid in the vessel 1 from a plurality of locations in different positions (these may be upstream and downstream, or need not necessarily be so), even if a plurality of the bubbles exist in the liquid, the possibility is increased that the pressure oscillation will be sufficiently applied to each of the plurality of bubbles.

Further, when the pressure oscillation is applied from the plurality of locations in the different positions (these may be upstream and downstream, or need not necessarily be so) on the liquid in the vessel 1 using the same frequency and the same phase, the pressure oscillations of the different vibration sources interfere with each other in the liquid. Therefore, it is thought that, in a plurality of positions in the liquid, the same effect as that obtained when the pressure oscillations are applied at different timings is obtained locally.

Further, in the above-described embodiments, as the vessel in which the liquid is filled, as well as using the vessel that has the liquid inlet and the plurality of liquid outlets, means (ie, the valves 7, 8, 9) is used for giving resistance to the flow of the liquid between inside and outside of the vessel. At the same time as the liquid passes through the vessel against the resistance, the volumetric capacity of the vessel is increased and decreased, thus depressurizing and pressurizing the interior of the vessel. In this manner, the volume of a bubble included in the liquid is increased and decreased and the bubble is caused to move to a specific liquid outlet, thus removing the bubble.

However, this type of vessel need not necessarily be used, and a vessel such as that disclosed in PTL 5 may be used, for example, in which membranes are provided in a plurality of locations with respect to a syringe through which liquid does not pass (a simple sealed vessel) and changes are thus effected. In other words, liquid may be filled in the syringe and in a state in which the liquid stays as it is in the syringe (namely, the liquid does not pass through the syringe), the interior of the vessel may be depressurized and pressurized by the membranes in the plurality of locations. With this method also, the bubble is moved upward more than in known art, and the bubble can be removed from the liquid.

The invention claimed is:

1. A bubble removal method for removing a bubble from liquid whose viscosity is reduced when shear occurs, comprising:
   causing the liquid to enter an interior of a vessel; and
   depressurizing and pressurizing the interior of the vessel from a plurality of locations by increasing and reducing a volumetric capacity of the vessel, wherein
       the depressurizing and pressurizing of the interior of the vessel causes an increase or a reduction in a volume of the bubble in the liquid which causes an increase in a natural ascending speed of the bubble.

2. The bubble removal method according to claim 1, wherein:
   the vessel comprises:
       a liquid inlet and a plurality of liquid outlets; and
       a device that provides resistance against a flow of the liquid between the inside and outside of the vessel,
   the liquid passes through the interior of the vessel against the resistance, and
   the depressurizing and pressurizing of the interior of the vessel causes the bubble to be removed by moving the bubble to a desired one of the plurality of liquid outlets.

3. The bubble removal method according to claim 1, wherein:
   timings at which the volumetric capacity of the vessel is increased and decreased from the plurality of locations of the vessel are different.

4. A bubble removal method comprising:
   causing a non-Newtonian fluid to pass through a vessel; and
   depressurizing and pressurizing an interior of the vessel from a plurality of locations of the vessel by changing a volumetric capacity inside the vessel through oscillation, wherein
       the depressurizing and pressurizing of the interior of the vessel causes an increase or decrease in a volume of a bubble included in the non-Newtonian fluid, and causes an increase in a natural ascending speed of the bubble.

5. The bubble removal method according to claim 4, wherein:
   the bubble removal method continuously removes bubbles,
   the vessel comprises:
       one or more inlets;
       two or more outlets; and
       devices for maintaining flow resistance are provided in each of the inlet and the outlets,
   the depressurizing and pressurizing of the interior of the vessel causes the bubbles the non-Newtonian fluid to move to a desired one of the two or more outlets, and the interior of the vessel is depressurized and pressurized from a plurality of locations of the vessel while maintaining a pressure change inside the vessel with devices for maintaining flow resistance that are provided in each of the inlet and the outlets.

6. The bubble removal method according to claim 4, wherein:
   causing a reciprocating flow to occur in the non-Newtonian fluid inside the vessel by shifting the phase of the oscillations from the plurality of locations or causing the frequency of the oscillations from the plurality of locations to be different.

7. A bubble removal device comprising:
   a vessel that comprises a plurality of movable portions arranged in mutually different locations,
      wherein movement of at least one of the plurality of movable portions varies a volumetric capacity of the vessel; and
   at least one volumetric capacity varying device that causes movement of at least one of the plurality of moveable portions, which causes an increase or decrease of the volumetric capacity of the vessel, wherein
      the at least one volumetric capacity varying device operates to increase and decrease the volumetric capacity of the vessel in a plurality of locations of the vessel,
   the decrease in the volumetric capacity of the vessel causes a decrease in the volume of the bubble and an increase in the volumetric capacity of the bubble causes an increase in the volume of the bubble, and
   the increase and decrease in volume of the bubble causes an increase in the natural ascending speed of the bubble.

8. The bubble removal device according to claim 7, wherein the vessel further comprises:
   a liquid inlet and a plurality of liquid outlets; and
   devices for providing resistance against flow of liquid between an inside and outside of the vessel, such that when the at least one volumetric capacity varying device increases or reduces the volumetric capacity of the vessel, the interior of the vessel is depressurized or pressurized.

9. The bubble removal device according to claim 7, wherein:
   the at least one volumetric capacity varying device increases and decreases the volumetric capacity of the vessel at mutually different timings in the plurality of locations of the vessel.

10. The bubble removal device according to claim 7, wherein:
    the at least one volumetric capacity varying device increases and reduces the volumetric capacity of the vessel through oscillation, and shifts a phase of oscillation from the plurality of locations or causes the frequency of the oscillation from the plurality of locations to be different.

11. A bubble removal device comprising:
    a vessel that comprises movable portions, wherein movement of at least one of the movable portions varies a volumetric capacity of the vessel; and
    a plurality of vibration generators for depressurizing and pressurizing an interior of the vessel by changing the volumetric capacity of a viscous fluid inside the vessel through oscillation; wherein
       the bubble removal device removes a bubble by depressurizing and pressurizing the interior of the vessel by changing the volumetric capacity of the viscous fluid flowing in the vessel through oscillation, thereby increasing and reducing a volume of the bubble in the viscous fluid and causing an increase in a natural ascending speed of the bubble,
       the plurality of vibration generators are provided in a plurality of locations of the vessel, and
       a reciprocating flow is caused to occur in the liquid inside the vessel by shifting a phase of oscillations of each of the vibration generators or causing the frequency of the oscillations of each of the vibration generators to be different.

12. The bubble removal device according to claim 11, wherein the vessel further comprises:
    one or more inlets;
    two or more outlets; and
    devices for maintaining flow resistance that are provided in each of the inlet and the outlets in order to maintain a pressure change in the interior of the vessel, wherein
       the bubble removal device continuously removes bubbles by depressurizing and pressurizing the interior of the vessel by changing the volumetric capacity of the viscous fluid flowing through the vessel through oscillation, thereby increasing and decreasing the volume of the bubbles in the viscous fluid and causing the bubbles to move to a desired one of the two or more outlets.

* * * * *